Patented Jan. 12, 1937

2,067,227

UNITED STATES PATENT OFFICE 2,067,227

METHOD OF PRODUCING CRYSTALLIZED ANHYDROUS SODIUM METASILICATE

Chester L. Baker, Berkeley, Calif., assignor to Philadelphia Quartz Company, Philadelphia, Pa., a corporation of Pennsylvania No Drawing. Application November 25, 1933, Serial No. 699,705

3 Claims. 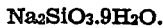 (Cl. 23—110)

This invention relates to the production of crystalline anhydrous sodium metasilicate and its principal object resides in the provision of a method for the production of such material in a form which is easily and quickly dissolved in water.

It is also an object of the invention to provide a method of preparing anhydrous crystalline sodium metasilicate from an aqueous solution of the metasilicate.

A further object of the invention resides in the provision of a method of making various intimate mixtures of crystalline anhydrous sodium metasilicate with other compatible substances. The mixtures so produced are so intimate in character as to result in distinct advantages not obtainable by the simple expedient of mechanically mixing the two ingredients separately formed. For example, a mixture with caustic soda can be made in accordance with the present invention which is less dangerous to those using it and is less likely to injure the work which is being cleaned. The intimate mixtures of the present invention behave in practice quite differently from mixtures that are not so intimate.

Before proceeding with a more detailed description of my invention I should like to point out that in my United States Patent No. 1,898,707 and in my copending United States applications Serial Nos. 551,785, filed July 18, 1931 and 652,418, filed January 18, 1933, I have disclosed various methods for the production of crystalline hydrates of sodium metasilicate in acceptable commercial form. More specifically the above patent and applications disclose means for preparing four crystalline hydrates of sodium metasilicate, namely, the pentahydrate, $Na_2SiO_3.5H_2O$; the hexahydrate, $Na_2SiO_3.6H_2O$; the octahydrate, $Na_2SiO_3.8H_2O$, and the nonahydrate, $$Na_2SiO_3.9H_2O.$$

In addition the anhydrous salt, $Na_2SiO_3$, has been shown to crystallize in water free silicate of soda glasses of suitable chemical composition. Vitreous glasses of this composition can be made by melting silica sand and sodium carbonate together in equimolecular proportions. Such products, however, dissolve in water much more slowly than most crystalline salts and this fact greatly limits their usefulness.

The anhydrous character of the material of the present invention permits a greater concentration of the active principles than is obtainable in the hydrated product and, therefore, saves a large amount in freight and carrying charges. For instance, sodium metasilicate pentahydrate carries approximately 41% of water, all of which weight is saved in the anhydrous product. In addition, the anhydrous product, upon solution in water, gives off heat, whereas the hydrated material absorbs heat. The heat thus liberated helps to raise the temperature of the water and, therefore, aids in the solution of the material, and since solutions of detergents are often used at high temperatures, this fact helps to gain the temperature desired.

My present invention involves the discovery that if a solution of sodium metasilicate be sufficiently evaporated it will become supersaturated in respect to anhydrous sodium metasilicate at any temperature above 72° C. which is approximately the melting temperature of sodium metasilicate pentahydrate. More specifically I have found that an aqueous solution containing at least 50% and preferably in the neighborhood of 57% or upwards of sodium metasilicate will yield crystals of anhydrous sodium metasilicate if heated to temperatures above 72° C.

In carrying out the invention, therefore, I may first prepare a solution of sodium metasilicate by any convenient method such as, for example, by mixing a solution of commercial silicate of soda with sufficient caustic soda so that the resulting solution contains silicon dioxide and sodium oxide in equi-molecular proportions. (It will be understood, of course, that the requirements of phase equilibrium permit some variation from the equi-molecular proportions of silicon dioxide and sodium oxide in the solution, the criterion of the permissible variation being that the solution yield anhydrous sodium metasilicate crystals as a stable solid phase.) Such a solution is then concentrated by evaporation until it contains preferably 57 or more percent of sodium metasilicate, at which point, as stated, it is supersaturated with respect to anhydrous sodium metasilicate at temperatures above 72° C. At this temperature, however, crystals will not readily form spontaneously. Indeed, at any temperature under about 100° C. the solution may be held for many hours and sometimes for days without the formation of any crystals of anhydrous sodium metasilicate. Furthermore, if such a solution is subjected to the usual crystallizing procedure of cooling with or without agitation, it will yield hydrated crystals only but never anhydrous crystals. It is apparent, therefore, that the methods of crystallization heretofore adopted by the art, or such, for example, as are described and claimed in my patent and in my applications above referred to will not result in the production of crystalline anhydrous sodium metasilicate.

But in accordance with the present invention, if the solution be heated to a temperature higher than the melting temperature of sodium metasilicate pentahydrate (i. e., approximately 72° C.) and preferably to about 120° C. or slightly higher, small crystals of anhydrous sodium metasilicate will rapidly appear in great numbers, as evidenced by the fact that the solution which was at first clear and transparent becomes white and milky in appearance. The microscope also may be used to detect the presence of the crystals. After they are formed the excess water may be disposed of by combining it with some suitable substance compatible with the metasilicate, such, for example, as sodium carbonate or sodium hydroxide, as will appear more fully hereinafter. In fact, quite a number of substances can be used for this purpose and, indeed, the substances mentioned in the examples appearing hereinbelow may be considered as having the ability to chemically absorb the excess water. Incidentally, substances which are suitable for the purpose are such as will produce a solid when combined with water if otherwise compatible with sodium metasilicate.

With the foregoing in mind, I will now give the following preferred examples of suitable methods for carrying out my invention, although I wish it to be distinctly understood that I do not wish to be limited to the exact procedure outlined.

*Example in which sodium carbonate is used to absorb the excess water*

1000 pounds of a solution of silicate of soda having 8.9% $Na_2O$ and 28% $SiO_2$ is run into a graining kettle equipped with a steam jacket and some suitable agitating means. 263 pounds of caustic soda containing 76% $Na_2O$ is added and dissolved by mixing. Steam is then turned into the jacket of the kettle and agitation continued until the mass becomes fairly white and thick. 300 pounds of anhydrous sodium carbonate are then added and mixed in. Upon continued heating and agitation the mass crumbles to a fine white powder comprising an intimate mixture of anhydrous sodium carbonate and anhydrous sodium metasilicate crystals.

*Example in which sodium hydroxide is used to absorb the excess water*

400 pounds of silicate of soda glass containing 23.5% $Na_2O$ and 76% $SiO_2$ is placed in a steam jacketed heavy paste mixer. This material should be previously ground preferably to pass a sieve having 200 openings to the inch. 95 pounds of water are then added followed by 500 pounds of caustic soda containing 76% $Na_2O$. The mass is further mixed and heated until it becomes smooth in consistency, and starts to thicken up slightly. This should require about an hour, and care should be exercised not to raise the temperature to such a point that water is lost from the mass, as this water is required for the formation of the desired sodium hydroxide monohydrate. The material is then discharged into a soap frame or other suitable container. Upon cooling, the material will transform into a hard brittle cake that can be ground to a free-flowing stable condition.

It is also quite possible to use other alkaline salts, soaps or substances of a similar compatible nature for the purpose of chemically absorbing a certain proportion of the water in order to remove it from the solution and permit the formation of the ultimate crystallized product. The result is an integrally crystallized mixture of markedly improved characteristics. The possible number of such mixtures is, of course, very great, and the conditions for producing them are dependent to some extent upon the individual peculiarities of the added substance and its possible reaction with the metasilicate.

In the examples given above, it is not necessary to evaporate all of the residual water because the added substance is capable of taking up or absorbing water with the formation of an apparently dry product. Sodium hydroxide has been found to be particularly useful in this respect. Furthermore, I have found that the formation of crystals is either absent or slight at temperatures in the neighborhood of 90° C. or lower and abundant at 120° C. or higher.

The crystals produced in accordance with my invention are microscopic in size and dissolve quickly in cold water so that they may be used directly as an alkaline salt. For example, they may be added directly to a laundry wash wheel for washing clothes.

What I claim is:—

1. The method of making anhydrous crystalline sodium metasilicate which comprises preparing a solution of sodium metasilicate containing upwards of approximately 50% of sodium metasilicate, agitating and heating the solution to a temperature upwards of 90° C. until crystals of anhydrous sodium metasilicate appear, and drying the mass by continuing the heat and adding a compatible alkali metal compound capable of absorbing excess water to form a solid.

2. The method of making anhydrous crystalline sodium metasilicate which comprises preparing a solution of sodium metasilicate containing upwards of approximately 50% of sodium metasilicate, agitating and heating the solution to a temperature upwards of 90° C. until the mass becomes fairly white and thick, and drying the mass by continuing the heat and adding sodium carbonate to absorb excess water.

3. The method of making anhydrous crystalline sodium metasilicate which comprises preparing a solution of sodium metasilicate containing upwards of approximately 50% of sodium metasilicate, agitating and heating the solution to a temperature upwards of 90° C. until the mass becomes fairly white and thick, and drying the mass by continuing the heat and adding sodium hydroxide to absorb excess water.

CHESTER L. BAKER.